US011014595B2

(12) United States Patent
Davies

(10) Patent No.: US 11,014,595 B2
(45) Date of Patent: May 25, 2021

(54) STEERING COLUMN ASSEMBLY

(71) Applicant: TRW Limited, Solihull (GB)

(72) Inventor: Niclas Davies, Birmingham (GB)

(73) Assignee: ZF Automotive UK Limited

( * ) Notice: Subject to any disclaimer, the term of this patent is extended or adjusted under 35 U.S.C. 154(b) by 79 days.

(21) Appl. No.: 16/487,560

(22) PCT Filed: Feb. 23, 2018

(86) PCT No.: PCT/GB2018/050484
§ 371 (c)(1),
(2) Date: Aug. 21, 2019

(87) PCT Pub. No.: WO2018/154322
PCT Pub. Date: Aug. 30, 2018

(65) Prior Publication Data
US 2020/0055538 A1 Feb. 20, 2020

(30) Foreign Application Priority Data

Feb. 23, 2017 (GB) ..................................... 1702904

(51) Int. Cl.
*B62D 1/184* (2006.01)
*B62D 1/185* (2006.01)
*B62D 1/189* (2006.01)
*B62D 1/19* (2006.01)

(52) U.S. Cl.
CPC ............ *B62D 1/184* (2013.01); *B62D 1/185* (2013.01); *B62D 1/189* (2013.01); *B62D 1/192* (2013.01); *B62D 1/195* (2013.01); *F16C 2326/24* (2013.01)

(58) Field of Classification Search
CPC ........ B62D 1/184; B62D 1/185; B62D 1/189; B62D 1/192; B62D 1/195; F16C 2326/24
See application file for complete search history.

(56) References Cited

U.S. PATENT DOCUMENTS

| 4,941,679 | A | 7/1990 | Baumann et al. | |
| 5,803,496 | A | 9/1998 | Cymbal | |
| 8,375,822 | B2 | 2/2013 | Ridgway et al. | |
| 10,099,715 | B2 * | 10/2018 | Bodtker | B62D 1/192 |
| 10,807,630 | B2 * | 10/2020 | Caverly | B62D 1/192 |
| 2016/0288821 | A1 * | 10/2016 | Sakuda | B62D 1/185 |
| 2017/0320513 | A1 * | 11/2017 | Dubay | B62D 1/184 |
| 2018/0111640 | A1 * | 4/2018 | Bodtker | B62D 1/189 |

FOREIGN PATENT DOCUMENTS

EP          1975036 B1      11/2010

* cited by examiner

*Primary Examiner* — Drew J Brown
(74) *Attorney, Agent, or Firm* — Robert James Harwood

(57) ABSTRACT

A steering column assembly comprises a shroud having an upper shroud part and a lower shroud part movable telescopically relative to one another, and a steering shaft. The upper shroud part carries an energy absorbing device which in normal use moves together with the upper shroud part. A blocking device is fixed to the lower shroud part or to a part of the vehicle that is fixed relative to the lower shroud part; and a connecting rod is connected at a first end to the blocking device and at a second end to a spring which is in turn connected to the lower shroud part or to the fixed part of the vehicle. An initiator module engages with a part of the connecting rod or spring when the blocking mechanism is in the unlocked position thereby to isolate the blocking device from the force of the spring.

20 Claims, 4 Drawing Sheets

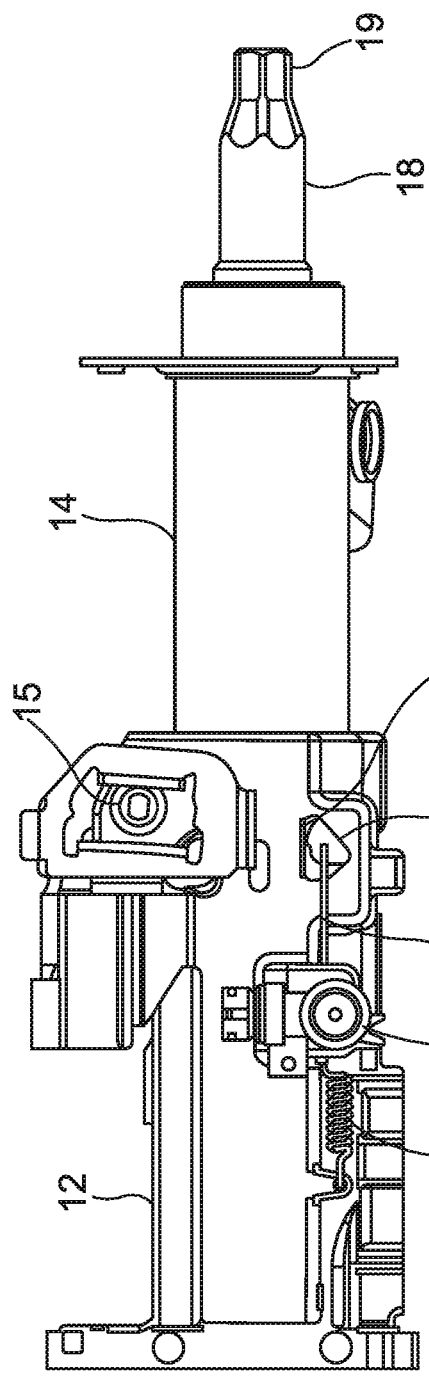
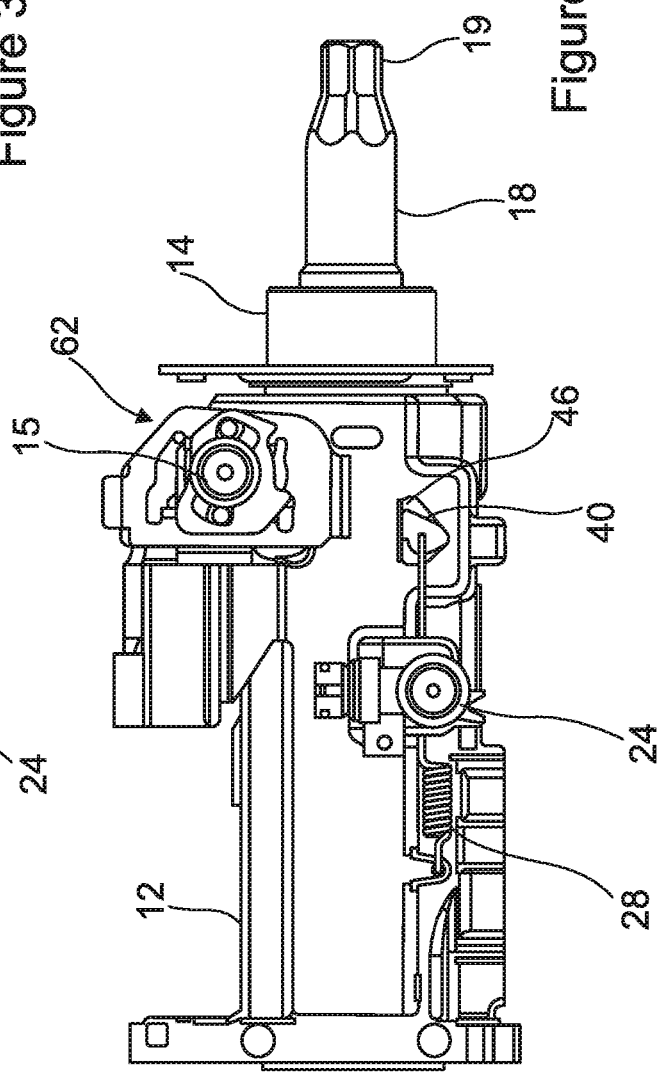

STEERING COLUMN ASSEMBLY

CROSS-REFERENCE TO RELATED APPLICATIONS

This application is a national stage of International Application No. PCT/GB2018/050484, filed Feb. 23, 2018, the disclosure of which is incorporated herein by reference in its entirety, and which claimed priority to United Kingdom Patent Application Serial No. 1702904.2, filed Feb. 23, 2017, the full disclosure of which is incorporated herein by reference in entirety.

TECHNICAL FIELD

The present disclosure relates to improvements in steering column assemblies.

BACKGROUND

It is known to provide a steering column assembly that can be adjusted for at least one of reach and rake. The steering column assembly typically comprises a shroud that supports a steering shaft. Where the assembly is adjustable for reach the shroud may comprise an upper part and a lower part, with the two being telescopically adjustable to allow the length of the shroud to be altered. The upper part is located closer to the steering wheel than the lower part. The steering shaft, which may also be telescopic, extends along the shroud and is supported by one or more bearing assemblies. One end of the steering shaft connects to a steering wheel of the vehicle and the other to a steering rack or gearbox. The shroud is held in position by a clamp mechanism that secures the shroud to a support bracket which is in turn secured to a fixed part of the vehicle such as a cross-member located behind the dashboard.

The steering column assemblies may be manually adjustable and to achieve this a clamp mechanism may be provided that includes an operating lever that can be operated by a user to move the clamp mechanism between an unclamped condition in which at least a part of the shroud can be moved relative to the support bracket and a clamped condition in which the part of the shroud is fixed relative to the support bracket. Alternatively it may be electrically adjustable in which case the clamp assembly need not be provided, the electric adjustment mechanism holding the shroud in the required position.

During a crash, a driver may be thrown forward onto the steering wheel, and in this case a load may be applied axially along the steering shaft. To prevent harm to the driver in this instance, the steering shaft should be designed to collapse axially allowing the steering wheel to move away from the driver. It is generally beneficial for this collapse to be controlled, with a resistance to movement of the steering wheel being determined by the steering column assembly. This controlled collapse better enables the energy of the driver to be absorbed in a controlled manner.

According to the invention, there is provided a steering column assembly comprising:

a shroud having an upper shroud part located towards an end of the column assembly nearest a steering wheel, and a lower shroud part located at an end of the column assembly furthest from the steering wheel, the two parts being movable telescopically relative to one another in the event of a crash to shorten the overall length of the shroud, a steering shaft that is supported by the shroud, and the upper shroud part carrying an energy absorbing device which in normal use moves together with the upper shroud part, characterised by further comprising a blocking mechanism that comprises:

a blocking device fixed to the lower shroud part or to a part of the vehicle that is fixed relative to the lower shroud part;

a connecting rod connected at a first end to the blocking device and at a second end to a spring which is in turn connected to the lower shroud part or to the fixed part of the vehicle, an initiator module which engages with a part of the connecting rod or spring when the blocking mechanism is in the unlocked position thereby locating the connecting bar in a fixed position whereby the blocking device is substantially isolated from the force of the spring and is held clear of energy absorbing device, the initiator module holding the spring under compression or in tension, and in which, in the locked position, the initiator module moves clear of the connecting rod whereby the force stored in the spring is released, causing the spring to move the connecting rod in turn to move the blocking device into positive engagement with the energy absorbing mechanism carried by the upper shroud portion.

The connecting rod may include a recess, a protrusion or a hole which receives or engages with a part of the initiator module when in the unlocked position.

Most preferably the connecting rod comprises an elongate wire. This may be a metal wire. It may have a cylindrical cross section. It may be rigid by which we mean that it is generally incompressible in use so that the rod can push and pull on the blocking device.

The wire may include a looped part which at least partially bounds a space which receives the portion of the initiator module and from which the part of the initiator module is withdrawn when the blocking mechanism is locked. The loop may be located close to the end of the connecting rod which is connected to the spring.

A hook portion on the end of the wire that extends orthogonally to the axis of the shroud may be received in a bore in the blocking device to connect the connecting rod to the blocking device.

The spring may comprise a helical spring.

The helical spring may comprise a coiled elongate wire, and may be integrally formed with the connecting rod. Hence the connecting rod and spring may be formed from a single wire. This provides a low component count.

The spring may, in the locked position, be held in tension by the connecting rod fixed in turn by the trigger pin, and when in the unlocked position may relax to reduce the length of the spring thereby pulling on the connecting rod. The spring reduces in length in this arrangement and pulls on the connecting rod to move the blocking device.

In an alternative the spring may be held in compression by the trigger pin in the locked position and on removing the trigger pin the spring may extend and push the connecting rod to move the blocking device.

The blocking device of the blocking mechanism may comprise a cam element connected to the connecting rod so that the motion of the connecting rod is converted into a rotary motion of the cam element.

The cam element may comprise at least one engagement tooth carried by a base portion, the base portion being connected to the lower shroud portion or to the fixed part of the vehicle through a pivot, movement of the cam element being achieved by rotation around the pivot pin when acted on by the connecting rod, the tooth engaging the upper shroud part when the blocking mechanism is in the unlocked condition and engaging when locked.

The tooth may be formed on an outer edge of the base portion of the cam element.

There may be a plurality of teeth, with more than one tooth engaging the energy absorbing device of the upper shroud part when in the locked position.

In an alternative, the teeth may be omitted and a friction engagement between the blocking element and the energy absorbing mechanism may be provided instead.

The movement of the cam between the unlocked and locked position may be such that the teeth (or friction surface) rotates in a direction with a component that extends away from the steering wheel end of the steering column assembly. This ensures that any movement of the energy absorbing mechanism during a crash with the blocking mechanism locked will tend to bind the teeth of the cam into the energy absorbing mechanism, ensuring the teeth will not be forced apart by the crash forces. The geometry may be chosen so that any loads on the teeth will pass through the blocking device to the lower shroud portion or fixed part of the vehicle.

The cam element may be located closer to the steering wheel end of the steering column assembly than the spring with the spring pulling on the cam element away from the steering wheel. When in the locked position the spring may apply a load to the cam element to hold it in place.

The energy absorbing mechanism carried by the upper shroud portion may comprise a sliding block which may carry a toothed rack, the cam element engaging the sliding block when the lock mechanism is in the locked position and being held clear of the sliding block when the lock mechanism in in the unlocked position. Where teeth are provided, the teeth of the block and teeth of the cam element may be interlocked when locked and otherwise held clear.

The toothed rack may extend along the upper shroud portion such that the cam element can engage the toothed rack for any position of the upper shroud portion within the normal range of adjustment of the steering column assembly for reach.

The sliding block may be connected to the upper shroud part by an energy absorbing strap or by a tear strip or any other arrangement which when deformed absorbs energy in a crash. When the toothed rack is fixed by the blocking device, any movement of the upper shroud portion will cause the strap or strip to deform or tear, absorbing energy during a crash that causes the steering column assembly to collapse.

The energy absorbing strap or tear strip may connect the sliding block to an intermediate sliding block, which is in turn connected to the upper shroud part through a second energy absorbing strap. A secondary blocking mechanism may be provided which includes a secondary blocking device which is operable between an unlocked position in which it is held clear of the intermediate sliding block and a locked position in which the secondary blocking mechanism engages the intermediate sliding block to fix it to the lower shroud part. This allows for a two stage control of energy by locking one, or both, blocking mechanisms to engage respective sliding blocks of the energy absorbing mechanism, thereby bringing one or both energy absorbing straps or tear strips into play.

The secondary blocking device may be connected to an actuator. The device may comprise a cam carrying teeth that may engage a rack of teeth on the intermediate sliding block, although a surface-surface friction engagement may be provided instead.

The assembly may include a manually operated clamp mechanism that is operable between a disengaged condition in which the clamp mechanism does not impede the telescopic movement of the upper shroud part and an engaged position in which the clamp mechanism prevents the telescopic movement of the upper shroud part relative to the lower shroud part. The actuator for the secondary blocking device may form a part of this clamp mechanism. In an alternative an electrically operated clamp mechanism may be provided.

The clamp mechanism, when manually operable, may include a lever that is connected to a clamp pin, the user grasping the lever to clamp and unclamp the clamp mechanism.

The initiator module may comprise a pyrotechnic device or an electro magnet. In each case a part of the module may be displaced when activated to move clear of the connecting rod, although it is also possible for a part of the device to break free or otherwise be ejected to release the connecting rod.

The steering column assembly may include a signal processor which provides a command signal to the initiator module in the event that the lock mechanism is required to move to the locked position.

The signal processor may issue the command signal in the event that a crash is detected, or when an event that is a precursor of a crash is detected. The signal may be issued, for instance, when the deceleration of the vehicle exceeds a threshold value, or when a sensor for activating a safety system such as an airbag or seat belt pretensioner is activated, or an unbelted driver is detected.

BRIEF DESCRIPTION OF THE DRAWINGS

There will now be described, by way of example only, one embodiment of the present invention with reference to and as illustrated in the accompanying drawings of which:

FIG. 3(a) is a detailed side view of the assembly when the blocking mechanism is in the unlocked position and with the steering column assembly fully extended;

FIG. 3(b) corresponds to FIG. 3(a) but showing the blocking mechanism in the locked position and the steering column fully collapsed following a crash.

DETAILED DESCRIPTION

Figure 1:
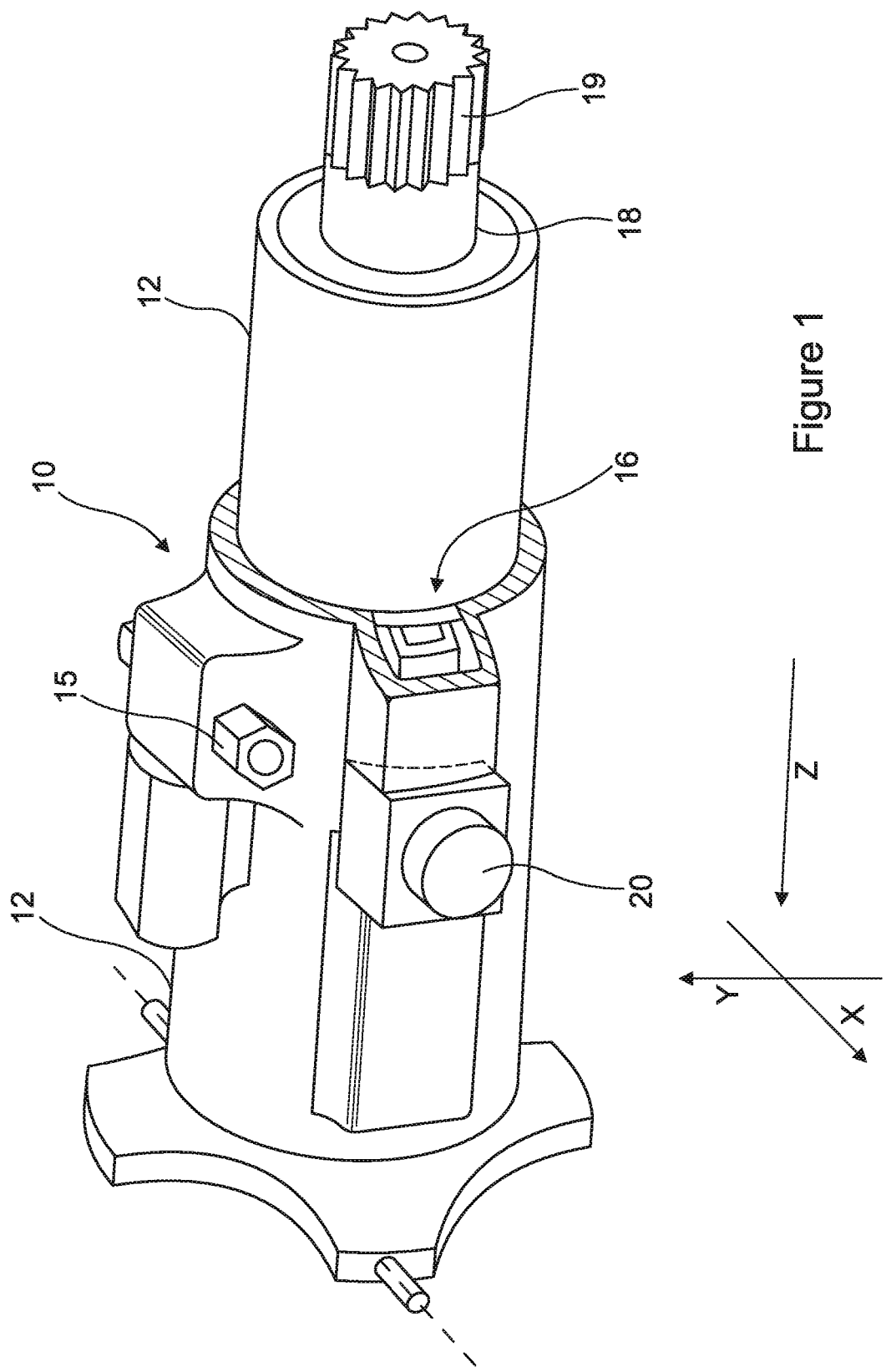
FIG. 1 is a perspective view of a steering column assembly in accordance with the present invention.

As shown in FIG. 1, a steering column assembly 10 comprises a two part telescopic shroud having an upper shroud part 14 located towards an end of the column assembly nearest a steering wheel, and a lower shroud part 12 located at an end of the column assembly furthest from the steering wheel, the two parts being movable telescopically relative to one another in the event of a crash to shorten the overall length of the shroud. The lower shroud part 12 as shown forms in this example a part of a gearbox assembly and is fixed in position at a pivot point that allows it to move to enable a tilt adjustment of the steering shroud around the axis of the pivot, in the direction Z in the drawing, but preventing it from moving axially, in the X direction of the drawings. Of course, a simpler steering column assembly within the scope of the present invention may adjust only for reach and in such a case the lower shroud part may be fixed so that it cannot pivot.

The shroud supports a two part telescopic steering shaft 18 that is supported by the shroud also having an upper part and a lower part that can move telescopically. The upper part of the shaft 18 is visible in FIG. 1 which terminates with a set of splines 18a allowing it to connect to the boss of a steering wheel that carries complimentary splines. Bearings, not shown, support the steering shaft within the shroud so that it is free to rotate as the steering wheel rotates. The end of the shaft furthest from the steering wheel is connected to the road wheels of the vehicle, through a gearbox (not shown) in this example.

The position of the upper shroud portion 14 in the X direction is controlled by a clamp assembly 15 (the end of which is visible in FIG. 1 and FIG. 3) that can be opened and closed by the driver. This allows the relative positions of the upper shroud part 14 and lower shroud part 12 to be fixed during driving with the clamp assembly closed, but allowing the reach of the steering to be adjusted when the clamp assembly is opened. The skilled person will be familiar with a wide variety of possible clamp assemblies that could be used within the scope of the present invention to achieve this function. In a simple arrangement the outer shroud part—in this case the lower shroud part 12—is squeezed onto the inner shroud part—in this case the upper shroud part 14—so that the friction between the two parts fixes them in place.

Figure 4:
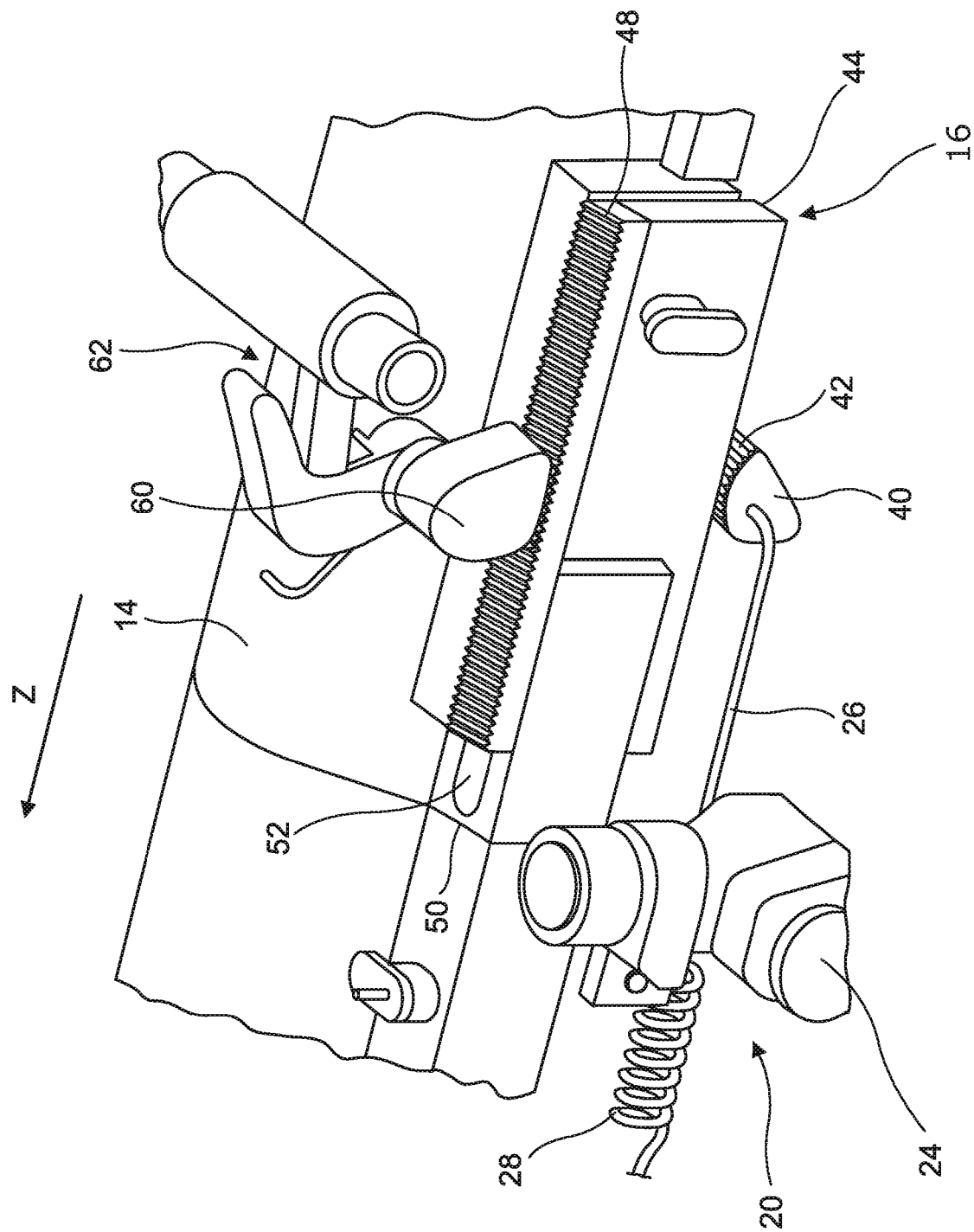
FIG. 4 is an enlarged perspective view of a portion of the assembly showing in more detail the blocking mechanism and energy absorbing device carried by the upper shroud portion prior to a crash deforming the energy absorbing device and with the blocking mechanism in the locked position, in which the lower shroud part is hidden for clarity.

The upper shroud part 14 carries an energy absorbing device 16 visible best in FIG. 4 and the lower shroud portion carries a blocking mechanism 20 that is operable between a disengaged condition in which the blocking mechanism does not impede the travel of the energy absorbing mechanism during telescopic movement of the upper shroud part and a locked position in which the lock mechanism engages the energy absorbing device to control the movement of the upper shroud part along the X direction. During normal use this lock mechanism is unlocked and held clear of the energy absorbing device.

As best shown in FIG. 4, the blocking mechanism 20 comprises a blocking device 40 fixed to the lower shroud part 12. This comprises a cam, which can rotate about a pivot pin (not shown) or simply slide over a curved bearing surface. The cam carries a set of teeth 42 along one edge furthest from the pivot pin. A connecting rod 26, in the form of an elongate wire, is connected by a hooked terminal end portion at a first end to the blocking element 80 and extends to form a helical spring 28 at its opposite end which is in turn connected to the lower shroud part. At a point along the wire between the hooked end and the spring is a single U-shaped half turn of wire 30 which receives a trigger pin 32 of an initiator module 24. The body of the initiator module (which in the example is a pyrotechnic device) is fixed to the lower shroud portion. The coil and trigger pin can be seen best in FIGS. 2 and 3.

The trigger pin 32 locates the connecting bar in a fixed position whereby the blocking device 40 is substantially isolated from the force of the spring and is held clear of the upper shroud portion. In this position the spring is held in tension between the pin at one end and the fixing to the lower shroud portion at the other end of the spring. In a modification, the spring could be held in compression.

In use, when a crash is detected or is imminent, the initiator module 24 is operated to move the trigger pin 32 away from the loop in the wire 26 whereby the spring is able to relax (or extend if compressed), the energy stored in the spring being applied through the wire 26 onto the blocking device 40, causing the wire 26 to move and in turn causing the blocking device to rotate about the pivot pin to bring the teeth 42 of the blocking device 40 into engagement with the energy absorbing mechanism carried by the upper shroud portion. The direction of movement from the unlocked to locked condition is chosen so that as the upper shroud tries to move in the Z direction away from the steering wheel it will tighten the engagement of the cam teeth onto the energy absorbing device 16 so that it cannot be forced out of engagement.

The function of the energy absorbing device is to control the movement of the upper shroud. Normally, the energy absorbing device can move freely with the upper shroud. In this condition the blocking device is unlocked. However, in a crash the apparatus will fix part of the energy absorbing device in position relative to the lower shroud so that any movement of the upper shroud will cause the energy absorbing device to deform. This will now be described in more detail for a preferred embodiment shown in the drawings.

More specifically, in this embodiment the energy absorbing device 16 comprises a sliding block 44 that defines a rack of teeth 46 that extend axially along the upper shroud part 14. These teeth 46 engage with the teeth 42 of the blocking device once the initiator module 24 has been activated. The sliding block is arranged parallel to a second sliding block 48. Both first and second sliding blocks are connected to the upper shroud part through respective energy absorbing straps.

The first slide block 44 is fixedly connected to a leg 50 of a first absorption strap such that the first absorption strap can plastically deform during a relative movement of the first sliding block 44 to the upper shroud part 14.

The second slide block 48 is fixedly connected to a leg of a second absorption strap 52 such that the second absorption strap 52 can plastically deform during a relative movement of the second slide block 48 relative to the upper shroud part 14. This plastic deformation enables energy in the collapse to be absorbed in a controlled manner.

The skilled reader will understand from the drawings that the cam element 40 fixes the first sliding block 46 when in a locked condition, yet allows the first sliding block 46 to move freely when unlocked. As a result, when the blocking device is in the locked position the sliding block 46 is firmly coupled in the axial direction X to the lower shroud part 12, as a result of which a relative movement occurs when the upper shroud part 14 is displaced in the axial direction X.

Figure 2A:
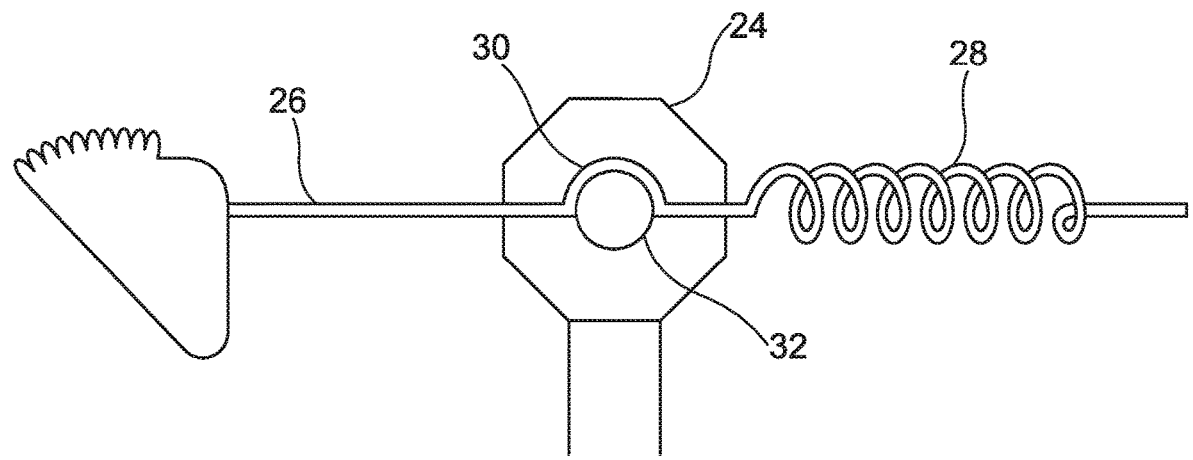
FIG. 2(a) is a detail of a blocking mechanism incorporated into the assembly of FIG. 1 in an unlocked position.
Figure 2B:
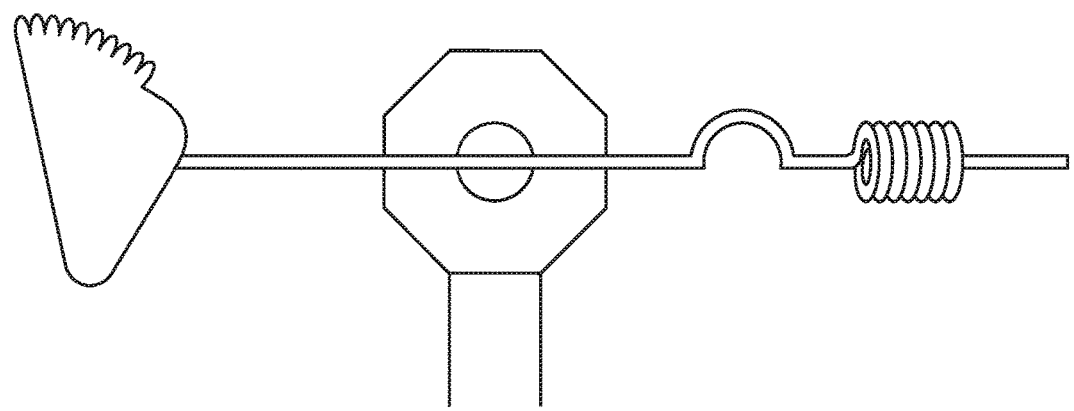
FIG. 2(b) is a detail corresponding to FIG. 2(a) with the blocking mechanism in the locked position.

A second fixing element 60 as shown in FIG. 2 can be coupled to the second sliding block 48 by means of a second actuator 62 that is fixed to the lower shroud part 12 or held clear of the second sliding block 48 by the second actuator. As a result, the second sliding block 48 can also be coupled firmly to the bearing element 12 in the axial direction X, as a result of which a relative movement occurs when the sleeve element 14 is displaced in the axial direction X.

Depending on the energy absorption requirement, one of the two absorption straps 50, 52 or both absorption straps 50, 52 can be coupled to the lower shroud part 12 in order to be able to absorb a quantity of energy adapted to the energy absorption requirement.

In the event that the first and second absorption straps 50, 52 can absorb a different amount of energy, a steering column assembly 10 can be provided with a two-stage adaptive energy absorption capability.

The invention claimed is:

1. A steering column assembly comprising:
a shroud having an upper shroud part located towards an end of the column assembly nearest a steering wheel, and a lower shroud part located at an end of the column assembly furthest from the steering wheel, the two parts being movable telescopically relative to one another in the event of a crash to shorten the overall length of the shroud, a steering shaft that is supported by the shroud, and
the upper shroud part carrying an energy absorbing device which in normal use moves together with the upper shroud part,
characterised by further comprising a blocking mechanism that comprises:
a blocking device fixed to the lower shroud part or to a part of the vehicle that is fixed relative to the lower shroud part;
a connecting rod connected at a first end to the blocking device and at a second end to a spring which is in turn connected to the lower shroud part or to the fixed part of the vehicle,
an initiator module which engages with a part of the connecting rod or spring when the blocking mechanism is in the unlocked position thereby locating the connecting bar in a fixed position whereby the blocking device is substantially isolated from the force of the spring and is held clear of energy absorbing device, the initiator module holding the spring under compression or in tension,
and in which, in the locked position, the initiator module moves clear of the connecting rod whereby the force stored in the spring is released, causing the spring to move the connecting rod in turn to move the blocking device into positive engagement with the energy absorbing mechanism carried by the upper shroud portion.

2. The steering column assembly according to claim 1, wherein the connecting rod includes a recess or hole or protrusion which receives or engages the initiator module.

3. The steering column assembly according to claim 1, wherein the connecting rod comprises an elongate wire.

4. The steering column assembly according to claim 3, wherein the elongate wire is rigid.

5. The steering column assembly according to claim 3, wherein the wire includes a full or partial loop which defines a boundary of a space which receives the part of the initiator module and from which the initiator module is withdrawn when the locking mechanism is unlocked.

6. A steering column assembly according to claim 5, wherein the loop is located close to the end of the connecting rod which is connected to the spring.

7. A steering column assembly according to claim 3, wherein the wire includes a hook portion on the end of the wire that extends orthogonally to the axis of the shroud and is received in a bore in the blocking device to connect the connecting rod to the blocking device.

8. A steering column assembly according to claim 7, wherein the spring comprises a helical spring.

9. A steering column assembly according to claim 8, wherein the helical spring comprises a coiled elongate wire.

10. A steering column assembly according to claim 9, wherein the helical spring is integrally formed with the connecting rod.

11. A steering column assembly according to claim 10, wherein the spring, in the locking position, is held in tension by the connecting rod, which is, in turn, fixed by the part of the initiator module, and when in the unlocked position the spring relaxes to reduce the length of the spring thereby pulling on the connecting rod to move the blocking device.

12. A steering column assembly according to claim 1, wherein the spring, in the locking position, is held in compression by the initiator module, and when in the unlocked position the spring relaxes to push the connecting rod to move the blocking device.

13. A steering column assembly according to claim 1, wherein the blocking device of the blocking mechanism comprises a cam element connected to the connecting rod so that the motion of the connecting rod is converted into a rotary motion of the cam element.

14. A steering column assembly according to claim 13, wherein the cam element comprises at least one engagement tooth carried by a base portion, the base portion being connected to the lower shroud portion or to the fixed part of the vehicle through a pivot, movement of the cam element being achieved by rotation when acted on by the connecting rod, the tooth being held clear of the upper shroud part when the blocking mechanism is in the unlocked condition and engaging when locked.

15. A steering column assembly according to claim 14, wherein the tooth is formed on an outer edge of the base portion of the cam element.

16. A steering column assembly according to claim 14, wherein the cam element includes a plurality of engagement teeth, with more than one tooth engaging the energy absorbing device of the upper shroud part when in the locked position.

17. A steering column assembly according to claim 14, wherein the movement of the cam between the unlocked and locked position may be such that the teeth rotate in a direction with a component that extends away from the steering wheel end of the steering column assembly.

18. A steering column assembly according to claim 17, wherein the cam element is located closer to the steering wheel end of the steering column assembly than the spring with the spring pulling on the cam element away from the steering wheel.

19. A steering column assembly according to claim 14, wherein the energy absorbing mechanism carried by the upper shroud portion comprises a sliding block, the cam element engaging the sliding block when the lock mechanism is in the locked position and being held clear of the toothed rack when the lock mechanism is in the unlocked position.

20. A steering column assembly according to claim 19 wherein the sliding block carries a rack of teeth and the cam element also includes teeth that engage the teeth of the rack in the locked position.

* * * * *